United States Patent [19]

Ebel

[11] 4,012,339
[45] Mar. 15, 1977

[54] METHOD FOR IMPROVING PHYSICAL PROPERTIES OF CATALYST MATERIALS THROUGH THE INCORPORATION OF FINES THEREIN AND CATALYST PREPARED BY THE METHOD

[75] Inventor: Robert Henry Ebel, Riverside, Conn.

[73] Assignee: American Cyanamide Company, Stamford, Conn.

[22] Filed: Nov. 4, 1975

[21] Appl. No.: 628,715

[52] U.S. Cl. .............................. 252/463; 423/625
[51] Int. Cl.² ........................................ B01J 21/04
[58] Field of Search ................ 252/463; 423/625

[56] References Cited

UNITED STATES PATENTS

| | | | |
|---|---|---|---|
| 3,173,883 | 3/1965 | Cornelius et al. | 252/463 X |
| 3,925,257 | 12/1975 | Horzepa et al. | 252/463 |

Primary Examiner—W. J. Shine
Attorney, Agent, or Firm—William J. van Loo

[57] ABSTRACT

The use of calcined fines in the preparation of catalyst materials from inorganic oxide gels results in improved physical properties when a significant portion of said fines are smaller than about 40 microns.

8 Claims, No Drawings

METHOD FOR IMPROVING PHYSICAL PROPERTIES OF CATALYST MATERIALS THROUGH THE INCORPORATION OF FINES THEREIN AND CATALYST PREPARED BY THE METHOD

This invention relates to an improved method for preparing a catalyst material. More particularly, this invention relates to such a method whereby an alumina catalyst material of improved physical properties is obtained by incorporating selected fines into the composition used to provide the catalyst structure.

Inorganic oxide gels are widely used in catalytic reactions wherein they serve as catalysts per se or serve as carriers or supports upon which activators and/or promoters are carried. These inorganic oxide gels are commonly referred to as catalyst materials even though they may have to be activated and/or promoted to provide adequate activity to serve as catalysts. Thus, the term "catalyst material" as used herein includes the support itself as well as the activated and/or promoted forms of the support.

In selecting inorganic oxide gels for use as catalyst material, prime considerations are given to activity, selectivity, stability, and physical characteristics. Of the available inorganic oxide gels, alumina is widely used as the catalyst material of choice. This is because alumina possesses or can be modified to possess the desired properties to a highly acceptable degree. In certain applications of alumina catalyst materials, it is often desirable to alter certain of their physical properties while, at the same time, not adversely affecting other of their physical properties. Such alterations are not readily accomplished, however.

In numerous applications of catalyst materials, it is desirable that such materials be in particulate form of consistent specific size for optimum performance. The catalyst materials may be prepared in such form by a number of molding techniques. A preferred molding technique is that of extrusion wherein the catalyst material is formed into strands of desired cross-sectional size and shape and subsequently rendered into the proper length to width ratio. Particulates prepared in this manner have a range of physical properties that are desirable for most applications. Variations in processing can result in alterations of the physical properties over a reasonable range.

In the preparation of particulate catalyst materials according to conventional procedures, a certain proportion of the particulates obtained at various stages of manufacture will be under the desired size and are called "fines." The fines are removed from the desired particulates as they occur and various provisions are made for their disposal. In some instances they are reacted with suitable chemicals, usually acids or alkalies, to provide source materials for preparing the inorganic oxide gels. In other instances, they may be blended with the gels used to prepare the particulate catalyst materials. Other methods of disposal may also be employed.

In particular instances where fines have been incorporated with the inorganic oxide gels used to form the particulate catalyst materials, the fines as obtained were admixed with the inorganic oxide gel in an amount which could be tolerated in the resulting particulate without significant adverse effect upon its desirable properties. The amount of fines that could be so tolerated varied depending upon the specific inorganic oxide gel employed and the method used to prepare the particulate therefrom, but in any instance the amount of tolerable fines was relatively small. In some instances, no fines could be tolerated without significant adverse effects on particulate properties. In other instances, up to about 20 weight percent fines could be tolerated but with some adverse effects on particulate properties such as crush strength. Thus, in the past, incorporation of fines in the inorganic oxide gel used to form particulate catalyst materials was a convenient means of working off limited amounts of by-product fines for economic considerations while not seriously adversely affecting particulate properties.

Alumina, in the form of such particulates, has been found to be an effective catalyst material in applications wherein the catalyst material is subjected to repeated violent shocks because such particulates possess a combination of good crush strength and attrition resistance. Under the influence of such shocks, the catalyst materials will generally strike violently against the container walls and abrade severely against one another. A specific example of such an application is the use of a particulate catalyst material in conjunction with auto exhaust emissions to reduce the levels of air pollutants associated therewith. In such use, an auto exhaust muffler device is filled with the catalyst material in a manner such that emitted gases must contact the catalyst material prior to exiting to the atmosphere. In normal operation of the automobile, it is impossible to avoid violent shocking of the catalyst material because of road conditions, driving habits, pulsating flow of the exhaust gas, and other factors which subject the muffler, and its contents, to repeated violent reactions. The catalyst particles, as a result of such shocks, are subjected to impacts which can cause particulate breakage and attrition which lead to production of particles of reduced size, called fines, which can be packed in a lesser volume of muffler space than was occupied by the original sized particulates and which can be blown out of the muffler through the supporting grid. Consequently, when particulate breakage and attrition occur, the catalytic volume of the exhaust muffler device will not be completely filled and channels will develop therein through which the exhaust gases can pass without contacting the catalyst particles and the extra space available can cause fluidizing of the bed. When this happens, the efficiency of the catalytic muffler device is seriously reduced in spite of the fact that the particulate catalyst material contained therein remains highly active for the catalytic reaction.

In order to reduce the tendency of channeling to occur from such actions in this and other applications of particulate catalyst materials, it would be extremely desirable to provide catalyst materials that have improved attrition resistance without adversely affecting other desirable properties thereof. The provision for such catalyst materials would constitute a significant advance in the art and satisfy a long-felt need.

In accordance with the present invention, there is provided an improvement in a process of producing a particulate catalyst material comprising preparing a moldable aqueous paste of an inorganic oxide gel, molding said paste to provide a structured catalyst material, and stabilizing the structured catalyst material by heat treatment, the improvement which comprises employing as said inorganic oxide gel one containing at least about 5 weight percent of calcined fines, based on the total weight of inorganic oxide gel and calcined fines, said fines having a particle size of less than about 100 mesh and at least about 30 weight percent of said fines having a particle size of less than about 325 mesh.

Catalyst particulates prepared in accordance with the process of the present invention are significantly improved in attrition resistance and in preferred embodiments are also improved in crush strength. These improvements are effected without adverse effect on other desirable properties of the particulate catalyst materials.

It is surprising, in accordance with the present invention, to provide a process wherein advantage can be taken of by-product fines to effect significant improvements in attrition resistance of particulate catalyst materials for several reasons. It would appear that the attrition resistance of the particulates would be a reflection of their crush strength, which, in turn, reflects cohesiveness of the particulate. However, particulates of the present invention surprisingly have increased attrition resistance even when improvements in crush strength are not observed. Since the fines used in accordance with the present invention are, among other things, calcined fines which are considered to possess a stable physical structure, it is surprising that they should aid in producing a structuring effect that would appear necessary to provide increased attrition resistance in the particulates obtained. These findings become all the more surprising when it is considered that prior art teachings suggest that no beneficial effects will arise from fines incorporation save the economic considerations realized from tolerance of said fines in the final particulates. Prior art teachings, however, do not contemplate the use of ground fines of small particle size.

In carrying out the process according to the present invention, the conventional procedures for preparing molded particulate catalyst materials are generally followed except for the provision of use of at least about 5 weight percent of calcined fines, based on the total weight of inorganic oxide gel being processed, such calcined fines having a particle size less than about 100 mesh and at least about 30 weight percent, preferably at least 99 weight percent, of such fines have a particle size less than 325 mesh (U.S. Standard Screen Size). By "calcined fines" as that term is employed herein is meant fines that are obtained upon calcination of catalyst material at a temperature in the range of about 800° F. to about 2200° F., preferably about 1100° F. to 2050° F.

The process of the present invention may be used in preparing particulates from the various conventional inorganic oxide gels normally used in preparing catalyst materials. Particularly good results are obtained using alumina as the inorganic oxide gel and, accordingly, alumina constitutes a preferred gel. In applications with alumina, it should constitute the principal inorganic oxide gel and minor amounts of other inorganic oxide gels may be present but still more preferably alumina will constitute the sole inorganic oxide gel.

A convenient method for preparing particulate alumina catalyst materials in accordance with conventional procedures is next described. It is to be understood, of course, that the present invention is not so limited as to processing and materials, but has the wider application set forth above and in the appended claims.

An alumina gel precipitate is first prepared in accordance with conventional procedures such as described in U.S. Pat. Nos. 3,032,514 and 3,096,845. The hydrogel initially prepared is washed to remove unwanted ions and then subjected to spray drying to provide a xerogel powder. After the spray-dried powder is obtained, it is processed by conventional procedures into the molded structure of a particulate. This may be conveniently done by means of a mix-muller and an extruder to provide an extrudate of the desired shape and size, which is stabilized by heat treatment. Typically, cylinders are formed of diameter from about 1/32 to ¼ inch having a length to width ratio of about 1:1 to 3:1, the length being established in a suitable manner such as by cutting. Other cross-sectional shapes may be provided, such as polylobal, dumb-bell, clover leaf and the like.

In processing powder to particulate form, as indicated, the powder is slurried to form a paste of consistency such that when extruded, the extrudates do not deform under their own weight as formed. The actual solids content of the paste may vary and will be within the range normally processed according to conventional procedures. The mix-muller provides the necessary action to provide the paste and various conventional additives may be used to modify porosity or density of the resulting particulates or to modify paste consistency. If desired, provision for activator and/or promoter content can be made in part or in toto by suitable additions to the muller mix. It is generally preferable, however, to provide for activator and/or promoter content after the particulates have been formed and stabilized by heat treatment.

In processing the paste prepared as described above, the present invention requires that at least about 5 weight percent of calcined fines, based on the total weight of powder being processed, be present. It is also required that the calcined fines be of a particle size such that all particles are less than about 100 mesh and that at least about 30 weight percent of such particles are less than about 325 mesh, the mesh sizes being according to U.S. Standard Screen Sizes. It is generally preferred that at least 99 weight percent of the particles is less than 325 mesh.

In order to obtain fines that have the particle size required, it is necessary to comminute the calcined fines normally obtained. A suitable grinding or pulverizing device is needed to provide the required particle size. Conventional pulverizers will provide about 40 weight percent fines of less that 325 mesh. Special grinders such as that manufactured by Schutz-O'Neill will provide 99 weight percent of less than 325 mesh. Screens that are 100 mesh have openings of 149 microns and those that are 325 mesh have openings of 44 microns, so that the particle sizes that pass through such screens are smaller than the size indicated. The calcined fines are screened to provide the right proportions of fine particles sizes and the oversized particles may be returned for further grinding.

The calcined fines may be obtained from various sources but it is generally preferred to employ calcined fines from previous preparations of the particulate catalyst material being provided. Thus, it is possible to employ fines of, for example, an all-alumina gel in preparing particulates from a co-gel of silica-alumina or, conversely, fines of a co-gel of silica-alumina in preparing particulates from an all-alumina gel, provided such use does not adversely affect properties of the resulting catalyst material. It is, of course, possible for the fines to contain activator and/or promoter contents consistent with those of the particulates being prepared and such activator and/or promoter contents can be taken into account when making provision for activator and/or promoter in the particulates being prepared.

As has been indicated, the amount of calcined fines of specified particle size that is to be incorporated in the muller paste is an amount that will provide the level of property improvements desired. Useful amounts will generally be at least about 5 weight percent, based on the total amount of powder being processed. However, the amounts may vary widely above this amount depending on the particular inorganic oxide gel being processed, the particular method of processing employed, the extent to which improved properties are desired, and other variables. Generally, at an amount less than 5 weight percent, on the basis stated, it is difficult to verify that property improvements are effected. The use of 100 weight percent of calcined fines has been found to give improved properties and, accordingly, represents the upper limit of usage. In many applications, usage of about 5 to 40 weight percent, on the basis indicated, has been found to provide admirable improvements and is generally preferred.

When fines are used alone to prepare the molded catalyst material, they are added with water to the mix-muller for processing. When fines are to be used in conjunction with spray-dried powder, the fines may be incorporated with the spray-dried powder in any convenient manner. The fines may be dry-blended with the powder prior to addition of the water used to prepare the paste. Alternatively, the fines and powders may be added with the water to the muller in any order.

After the paste mixture has been prepared as indicated, it is molded into the desired particulates, as previously indicated. The resulting extrudates are then subjected to heat treatment. Heat treatment is carried out in accordance with conventional procedures. Such heat treatment may involve drying and calcining or a combination treatment to effect both drying and calcination. Drying, when carried out as a separate operation, may constitute a single step or a series of steps generally using increased temperatures in successive steps and is usually referred to as "staged drying." Calcination may also be in one or more steps, using varying temperatures, as desired.

After the extrudates have been heat treated, provisions for activators and/or promoters may be made, if not already provided for in conjunction with processing. The use of activators and/or promoters will be in accord with conventional procedures taking into account the specific catalytic process in which the catalyst material is to be used.

It is to be understood that in processing an inorganic gel to a particulate catalyst material, no new teachings are required except for the fact that calcined fines of specific size are to be used as indicated.

The invention is more fully illustrated by the examples which follow wherein all parts and percentages are by weight unless otherwise specified. No specific details or enumerations contained therein should be construed as limitations on the present invention, except insofar as they appear in the appended claims.

In the following examples, reference is made to certain physical properties of the catalyst materials. These properties are determined in the manner next described.

Crush Strength

Crush strength is determined by placing an extrudate on its side between two parallel plates. Force is applied by means of pneumatic pressure until the extrudate is crushed. The device is such that the air pressure in pounds to cause crushing is the Crush Strength of the extrudate.

Attrition Loss

A set volume of material to be tested is placed in an inverted one liter Erlenmeyer flask of special construction that has a metal orifice inlet and a large (1 inch) outlet covered with 14-mesh screening. High velocity dry nitrogen gas is flowed through the inlet orifice causing the particles to: (1) circulate over one another thus causing attrition, and (2) impact themselves in the top section of the flask thus breaking down as a function of strength. The material is tested for five minutes and then weighed. The loss in weight after testing is designated the Attrition Loss.

The nitrogen flow will be in the range of about 3.5 and 4.0 cubic feet per minute, depending upon the density of the material. The flow rate must be sufficient for the particles to strike the top of the flask. The fines produced by attrition are carried out of the flask by the nitrogen flow thus causing a loss of weight of the original material charged.

EXAMPLES 1 – 7

A series of runs was conducted on laboratory equipment in which a series of calcined extrudates were prepared from spray dried alumina. A conventional mix-muller and extruder were employed following conventional procedures.

In a comparative run, no fines were incorporated in the mixture being processed. In the examples of the invention varying amounts of two grinds of calcined fines of previous preparations of the comparative run were employed. The various details of the runs and the properties obtained are given in Table I. All particles of the fines employed passed through a 100 mesh screen and the percentage passing through a 325 mesh screen is indicated.

TABLE I

| | | | Laboratory-Scale Runs | | Properties after 1100° F. Calcining Treatment | |
| --- | --- | --- | --- | --- | --- | --- |
| Ex. | Powder Type | Fines Composition | Fines (%) | Muller Solids (%) | Crush Strength (lbs.) | Attrition (%) |
| Comp. | D | None | 0 | 36.5 | 27.3 | 7.2 |
| 1 | D | 37.5% – 325 mesh | 5 | 35.8 | 27.5 | 4.4 |
| 2 | D | 37.5% – 325 mesh | 11 | 38.5 | 29.1 | 3.3 |
| 3 | D | 37.5% – 325 mesh | 22 | 36.5 | 26.8 | 5.4 |
| 4 | D | 51.3% – 325 mesh | 5 | 38.0 | 30.6 | 4.6 |
| 5 | D | 51.3% – 325 mesh | 11 | 37.5 | 32.7 | 4.8 |
| 6 | D | 51.3% – 325 mesh | 22 | 37.5 | 24.6 | 5.4 |

TABLE I-continued

| | | | Laboratory-Scale Runs | | Properties after 1100° F. Calcining Treatment | |
|---|---|---|---|---|---|---|
| Ex. | Powder Type | Fines Composition | Fines (%) | Muller Solids (%) | Crush Strength (lbs.) | Attrition (%) |
| 7 | None | 99% – 325 mesh | 100 | 51.1 | 36.1* | 5.5* |

*After Calcination at 2050° F.

From Table I it can be seen that attrition resistance is enhanced by the addition of calcined fines of controlled particle size and that in some instances improved crush strength is also obtained.

EXAMPLES 8 – 15

Based on the findings reported in Table I, a series of production scale preparations were made following the procedure described above. Four separate spray-dried powders were employed, these powders resulting from different runs and differing from the powder used in Examples 1–7 above. Two different fines compositions were incorporated in varying amounts. The fines all passed through a 100 mesh screen and the percentage passing through a 325 mesh screen is indicated in Table II, which also gives the details of the examples and properties of the extrudates obtained.

From Table II it can be seen that a higher percentage of minus 325 mesh fines results in higher improvements in attrition resistance and crush strength.

TABLE II

| | | | | Production-Scale Runs | | | Properties After Kiln Treatment | |
|---|---|---|---|---|---|---|---|---|
| Ex. | Powder Type | Pwd (lbs.) | Fines (lbs.) | Fines Composition | Water (lbs.) | % Fines | Crush Strength | Attrition (%) |
| 8 | A | 450 | 100 | 40% – 325 mesh | 650 – 650 | 22 | 10.0 | 5.5 |
| 9 | A | 450 | 100 | 99% – 325 mesh | 640 – 650 | 22 | 20.0 | 4.0 |
| 10 | B | 510 | 50 | 40% – 325 mesh | 720 – 740 | 11 | 7.5 | 12.5 |
| 11 | B | 510 | 50 | 99% – 325 mesh | 720 – 740 | 11 | 14.5 | 9.2 |
| 12 | B | 450 | 100 | 99% – 325 mesh | 720 – 740 | 22 | 15.0 | 9.0 |
| 13 | C | 510 | 50 | 40% – 325 mesh | 650 – 660 | 11 | 10.5 | 4.0 |
| 14 | C | 510 | 50 | 99% – 325 mesh | 650 – 660 | 11 | 13.5 | 3.5 |
| 15 | E | 385 | 150 | 99% – 325 mesh | 700 – 720 | 33 | 11.9 | 3.2 |

Pwd = ~78% Solids
Fines = ~100% Solids
Kiln Temperature = 1950° F.

I claim:

1. In a process of producing a particulate catalyst material comprising preparing a moldable aqueous paste of an inorganic oxide gel, molding said paste to provide a structured catalyst material, and stabilizing the structured material by drying and calcining, the improvement which comprises employing as said inorganic oxide gel one containing at least about 5 weight percent of calcined fines, based on the total weight of said inorganic oxide gel and said fines, said fines having a particle size less than about 100 mesh and at least 30 weight percent of said fines having a particle size less than about 325 mesh.

2. The process of claim 1 wherein said inorganic oxide gel is alumina.

3. The process of claim 1 wherein the amount of said calcined fines is from about 5 to 40 weight percent.

4. The process of Claim 1 wherein the amount of said calcined fines is 100 weight percent.

5. The process of claim 1 wherein 99 weight percent of said fines have a particle size less than about 325 mesh.

6. The process of claim 1 wherein said inorganic oxide gel is alumina.

7. The process of claim 6 wherein said fines are alumina.

8. A catalyst particulate consisting essentially of a spray-dried alumina hydrogel and calcined alumina fines from previous preparation of said catalyst particulate prepared by the process of claim 7.

* * * * *